United States Patent
Grollman et al.

(10) Patent No.: US 12,343,878 B2
(45) Date of Patent: Jul. 1, 2025

(54) SYSTEMS AND METHODS FOR DETERMINING OPERATIONAL PARADIGMS FOR ROBOTIC PICKING BASED ON PICK DATA SOURCE

(71) Applicant: Plus One Robotics, Inc., San Antonio, TX (US)

(72) Inventors: Daniel Grollman, Boulder, CO (US); Maulesh Trivedi, Atlanta, GA (US)

(73) Assignee: Plus One Robotics, Inc., San Antonio, TX (US)

( * ) Notice: Subject to any disclaimer, the term of this patent is extended or adjusted under 35 U.S.C. 154(b) by 355 days.

(21) Appl. No.: 17/894,782

(22) Filed: Aug. 24, 2022

(65) Prior Publication Data
US 2023/0068204 A1 Mar. 2, 2023

Related U.S. Application Data

(60) Provisional application No. 63/236,670, filed on Aug. 24, 2021.

(51) Int. Cl.
*B25J 9/16* (2006.01)
*B25J 19/02* (2006.01)

(52) U.S. Cl.
CPC .......... *B25J 9/1669* (2013.01); *B25J 9/1689* (2013.01); *B25J 9/1697* (2013.01); *B25J 19/023* (2013.01)

(58) Field of Classification Search
CPC ...... B25J 9/1669; B25J 9/1689; B25J 9/1697; B25J 19/023; B25J 9/1674; G05B 2219/40099; G05B 2219/40607; G05B 2219/45063
See application file for complete search history.

(56) References Cited

U.S. PATENT DOCUMENTS

| | | | |
|---|---|---|---|
| 6,836,702 B1 | 12/2004 | Brog.ang.rdh et al. | |
| 9,283,675 B2 * | 3/2016 | Hager | A61B 34/37 |
| 9,630,318 B2 * | 4/2017 | Ibarz Gabardos | G06N 20/00 |
| 12,053,887 B2 * | 8/2024 | Shentu | B25J 9/1687 |
| 2013/0340682 A1 | 12/2013 | Bareket | |
| 2018/0319015 A1 | 11/2018 | Sinyavskiy et al. | |

(Continued)

OTHER PUBLICATIONS

International Search Report of the counterpart PCT application No. PCT/US22/41407 dated Nov. 8, 2022.

(Continued)

*Primary Examiner* — Kira Nguyen
(74) *Attorney, Agent, or Firm* — Outlier Patent Attorneys, PLLC

(57) ABSTRACT

The present disclosure is for systems and methods for adjusting operational configurations of robots in real-time. The invention pertains to overriding or replacing one operational configuration of a robot with another when appropriate circumstances arise and certain conditions have been met. In one aspect, the invention is applicable to robotic picking operations and serves to allow for unique robotic picking operations outside of the normal or standard limitations typically imposed on a robotic picking system. The invention provides the ability to remotely adjust robotic operational configurations in real-time, on-demand, in order to address various circumstances that may arise without requiring interruption of a picking session or requiring on-site human intervention.

20 Claims, 12 Drawing Sheets

(56) References Cited

U.S. PATENT DOCUMENTS

| | | | |
|---|---|---|---|
| 2019/0105779 A1* | 4/2019 | Einav | B25J 9/1689 |
| 2020/0130176 A1* | 4/2020 | Hudson | G05B 13/027 |
| 2020/0306988 A1* | 10/2020 | Shaffer | G05B 19/4184 |
| 2023/0069565 A1* | 3/2023 | Kalouche | B25J 9/1656 |

OTHER PUBLICATIONS

Written Opinion of ISA/US of the counterpart PCT application No. PCT/US22/41407 dated Nov. 8, 2022.

* cited by examiner (a)

(b)

(a)

(b)

SYSTEMS AND METHODS FOR DETERMINING OPERATIONAL PARADIGMS FOR ROBOTIC PICKING BASED ON PICK DATA SOURCE

CROSS-REFERENCE TO RELATED APPLICATIONS

This application claims the benefit of U.S. Provisional Application 63/236,670, filed Aug. 24, 2021, titled "SYSTEM AND METHOD FOR DETERMINING OPERATIONAL PARADIGMS FOR ROBOTIC PICKING BASED ON PICK DATA SOURCE," which is herein incorporated by reference in its entirety.

BACKGROUND

Current robotic picking systems are generally configured with limitations imposed on the robot preventing the robot from operating at its maximum capabilities. This is typically done for safety purposes, to satisfy legal, insurance, regulatory, or company requirements, and/or to prevent damage to items being picked, the pick environment, and the robot itself. However, such limitations result in scenarios where the robot would be capable of performing a picking operation, but is prevented from doing so because the pre-set configurations prevent such. For example, when picking from a pallet, objects may occasionally fall or be knocked onto the floor next to a pallet. This could result in pick objects being outside of an area where the robot is allowed to interact due to preloaded operational configurations, however still within the reachable area of the robot. Under current approaches, a human would typically be required to visit the picking environment to handle the fallen objects manually or move them back onto the pallet and within an area reachable under the operational configuration of the robot, either of which can delay a picking process, lower efficiency, increase cost, etc.

Furthermore, in conventional approaches, robots may often be limited to a single operational paradigm while scenarios arise where one or more different operational configurations may better suit a given scenario. However, conventional systems may not be adjustable in real-time to switch to a different or more ideal operational paradigm (e.g. unable to override a standard operational configuration in real-time such as during an ongoing picking session). Moreover, many systems may lack the ability to be updated remotely to alter the operational configuration of an associated robot and instead require a technician to make on-site adjustments to operational paradigms.

SUMMARY

Systems and methods in accordance with various embodiments of the present disclosure may overcome one or more of the aforementioned and other deficiencies experienced in conventional approaches to controlling systems. In particular, various embodiments describe approaches for determining appropriate operational paradigms for robots, robotic systems, and/or other smart systems in order to optimize system performance along a variety of different selection criteria specifying various performant dimensions, including, but not limited to improving system efficiency, reducing robot and/or robotics systems idle time, reducing technician idle time, improving triage outcomes, reducing data processing loads, maintaining client confidentiality, and the like.

For example, pick interaction data can be received from, for example, a vision system, an intervention system, a data acquisition system, a robotic picking unit, or other appropriate system or component in communication with a robotic picking unit and/or components of a robotic picking system. A determination can be made based on the pick interaction data whether intervention is required. For example, in the situation where the pick interaction data is associated with a tag or other data indicating the pick interaction data is associated with a threshold degree of certainty, the pick interaction data can be provided to a robotic picking unit without additional intervention. In this example, the pick interaction data may represent a pick within the confines of an operational paradigm associated with the robotic picking unit that is deemed safe for autonomous picking without further interaction.

In the situation where the pick interaction data is associated with a tag or other data indicating the pick interaction data does not satisfy a threshold degree of certainty, or otherwise represents picking operations outside of the operational paradigm within which the robotic picking unit is allowed to operate autonomously or semi-autonomously, additional intervention may be required. Additional intervention can include situations where, for example, objects have fallen or been knocked over (e.g. off a pallet, conveyor belt, rack, tote, chute, etc.) or for other reasons are in the pick space, outside of a location deemed accessible by the operational configuration of a robotic picking unit, yet still within reach of the robotic picking unit, or require operational parameters (e.g. force, torque, speed, acceleration, etc.) which would exceed the established operational paradigm for autonomous picking operations. In these situations, the pick interaction data can be associated with a tag or other data operable to override an operational configuration of the robotic picking unit to cause the robotic picking unit to, e.g., pick objects located outside of the robotic picking unit's autonomous operational confines.

Instructions for causing a computer system to determine appropriate operational paradigms for robots, robotic systems, and/or other smart systems in accordance with the present disclosure may be embodied on a computer-readable medium. For example, in accordance with an embodiment, a backend system may maintain operational paradigms for a plurality of robots, robotic systems, and/or other smart systems. The backend system can utilize the operational paradigms to determine whether intervention is required. For example, the backend system can receive interaction data. The backend system can make a determination based on the pick interaction data whether intervention is required. For example, in the situation the pick interaction data is associated with a tag or other data indicating the pick interaction data is associated with a threshold degree of certainty, the backend system can provide the pick interaction data to a robotic picking unit without additional intervention. In the situation the pick interaction data is associated with a tag or other data indicating the pick interaction data does not satisfy a threshold degree of certainty, or otherwise represents picking operations outside of the operational paradigm within which the robotic picking unit is allowed to operate autonomously or semi-autonomously, the backend system may require additional intervention and may associate a tag or other data with the pick interaction data, wherein the tag is operable to override an operational configuration of a robotic picking unit to cause the robotic picking unit to, e.g., pick objects located outside of the robotic picking unit's autonomous operational confines.

It should be noted that although the techniques described herein may be used for a wide variety of users and intervention requests, for clarity of presentation, examples of companies providing robotic picking systems will be used. The techniques described herein, however, are not limited to robotic picking systems, and the intervention request may be from entities that are not robots, robotic systems, and/or other smart systems.

Embodiments provide a variety of advantages. For example, in accordance with various embodiments, human technicians or other appropriate intervention resources may intervene from anywhere, including off-site locations without degradation in the quality of intervention and leading to an improvement in the behavior of the automated picking systems. Moreover, the present invention reduces time and costs associated with responding to intervention requests when compared to conventional intervention systems where human technicians or other such resources have to be physically present to respond to intervention requests, and in many situations, have to walk to or otherwise travel to these systems. Various other functions and advantages are described and suggested below as may be provided in accordance with the various embodiments.

The present invention comprises a computer-implemented method for enabling a robotic control system associated with a robot to switch from a default configuration to an override configuration in order to process objects which cannot be processed in the default configuration. The computer-implemented method comprises obtaining, by a processor, an override request identifying an object that cannot be processed by a robot based on a default configuration available to a robotic control system associated with the robot, the override request obtained from at least one of a vision system and an intervention system.

The computer-implemented method may further comprise switching, by the processor, the default configuration to an override configuration upon receiving the override request, the switching enabling identification of additional instructions for use in control of the robot.

The computer-implemented method may further comprise obtaining, by the processor, override control instructions comprising instructions that cannot be processed in the default configuration.

The computer-implemented method may further comprise assigning, by the processor, pick tag data to each obtained override control instruction, the pick tag data indicating a source of the obtained override control instruction.

The computer-implemented method may further comprise obtaining, by the processor, a validation for each obtained override control instruction indicating that the override control instruction is appropriate, the validation including a validation source identifier.

The computer-implemented method may further comprise generating, by the processor, override switching instructions.

The computer-implemented method may further comprise providing, by the processor, to the robotic control system at least one of the override control instructions and the generated override switching instructions, wherein the obtained override control instructions and the generated override switching instruction enable the robot associated with the robotic control system to process the object that cannot be processed based on the default configuration.

The computer-implemented method may comprise the switching being executed automatically or via human input.

The computer-implemented method may comprise the switching enabling at least one of the vision system and the intervention system to provide additional instructions that cannot be processed in the default configuration.

The computer-implemented method may comprise the validation being obtained automatically or via human input.

The computer-implemented method may comprise a first override configuration requires a first validation and wherein a second override configuration requires a second validation different than the first validation.

The computer-implemented method may comprise storing, by the processor, the validation source identifier.

The computer-implemented method may comprise the pick tag data being comprised of a first tag providing that the override control instruction is obtained from the vision system, a second tag providing that the override control instruction is obtained from a combination of the vision system and the intervention system, and a third tag providing that the override control instruction is obtained from the intervention system.

The computer-implemented method may comprise at least one of the second tag and the third tag being associated with an identifier indicative of a user associated with the intervention system.

The computer-implemented method may comprise obtaining pick space data, the pick space data comprising data associated with at least a first pick area and a second pick area, wherein the first pick area and second pick area have at least one different boundary.

The computer-implemented method may comprise the first pick area defining an area within which a robot is constrained to performing operations under the default configuration and the second pick area defining an area extending beyond the first pick area along at least one dimension.

The computer-implemented method may comprise the pick space data being comprised of at least one of two dimensional image data and three dimensional depth data.

The computer-implemented method may comprise the override control instructions being determined based on the obtained pick space data.

The computer-implemented method may comprise the override control instructions from the vision system being comprised of override control instructions automatically determined from the pick space data.

The computer-implemented method may comprise the override control instructions from the intervention system being comprised of override control instructions provided via human interaction with the intervention system in association with the obtained pick space data provided to the intervention system.

The computer-implemented method may comprise the providing the at least one of the override control instructions and the generated override switching instructions being comprised of providing the at least one of the override control instructions and the generated override switching instructions such that the robot is enabled to interleave the provided at least one of the override control instructions and the generated override switching instructions with control instructions from other sources or with control instructions associated with an existing object processing plan.

The computer-implemented method may comprise the override control instructions enabling the robot to exceed at least one limitation of the default configuration, the at least one limitation comprising at least one of an operational boundary, an operational force, an operational torque, an operational acceleration, an operational speed, an operational range of motion of the robot, an operational positioning of the robot, and an operational orientation of the robot.

The computer-implemented method may comprise the override switching instructions being comprised of identification of an override configuration for the robotic control system to apply to controlling the robot.

The computer-implemented method may comprise the obtaining an override request being comprised of obtaining the override request via a selection an override option via a graphical user interface (GUI).

The present invention comprises a computing system for for enabling a robotic control system associated with a robot to switch from a default configuration to an override configuration in order to process objects which cannot be processed in the default configuration, the computing system comprising at least one computing processor and memory comprising instructions that, when executed by the at least one computing processor, enable the computing system to perform at least one step associated with enabling robotic operations under the override configuration.

The computing system may enable obtaining, by a processor, an override request identifying an object that cannot be processed by a robot based on a default configuration available to a robotic control system associated with the robot, the override request obtained from at least one of a vision system and an intervention system.

The computing system may further enable switching, by the processor, the default configuration to an override configuration upon receiving the override request, the switching enabling identification of additional instructions for use in control of the robot.

The computing system may further enable obtaining, by the processor, override control instructions comprising instructions that cannot be processed in the default configuration.

The computing system may further enable assigning, by the processor, pick tag data to each obtained override control instruction, the pick tag data indicating a source of the obtained override control instruction.

The computing system may further enable obtaining, by the processor, a validation for each obtained override control instruction indicating that the override control instruction is appropriate, the validation including a validation source identifier.

The computing system may further enable generating, by the processor, override switching instructions.

The computing system may further enable providing, by the processor, to the robotic control system at least one of the override control instructions and the generated override switching instructions, wherein the obtained override control instructions and the generated override switching instruction enable the robot associated with the robotic control system to process the object that cannot be processed based on the default configuration.

The present invention comprises a non-transitory computer readable medium comprising instructions for enabling a robotic control system associated with a robot to switch from a default configuration to an override configuration in order to process objects which cannot be processed in the default configuration, the instructions, when executed by a processor, enable the processor to perform at least one step associated with enabling robotic operations under the override configuration.

The instructions comprised in the non-transitory computer readable medium may enable obtaining, by a processor, an override request identifying an object that cannot be processed by a robot based on a default configuration available to a robotic control system associated with the robot, the override request obtained from at least one of a vision system and an intervention system.

The instructions comprised in the non-transitory computer readable medium may further enable switching, by the processor, the default configuration to an override configuration upon receiving the override request, the switching enabling identification of additional instructions for use in control of the robot.

The instructions comprised in the non-transitory computer readable medium may further enable obtaining, by the processor, override control instructions comprising instructions that cannot be processed in the default configuration.

The instructions comprised in the non-transitory computer readable medium may further enable assigning, by the processor, pick tag data to each obtained override control instruction, the pick tag data indicating a source of the obtained override control instruction.

The instructions comprised in the non-transitory computer readable medium may further enable obtaining, by the processor, a validation for each obtained override control instruction indicating that the override control instruction is appropriate, the validation including a validation source identifier.

The instructions comprised in the non-transitory computer readable medium may further enable generating, by the processor, override switching instructions.

The instructions comprised in the non-transitory computer readable medium may further enable providing, by the processor, to the robotic control system at least one of the override control instructions and the generated override switching instructions, wherein the obtained override control instructions and the generated override switching instruction enable the robot associated with the robotic control system to process the object that cannot be processed based on the default configuration.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
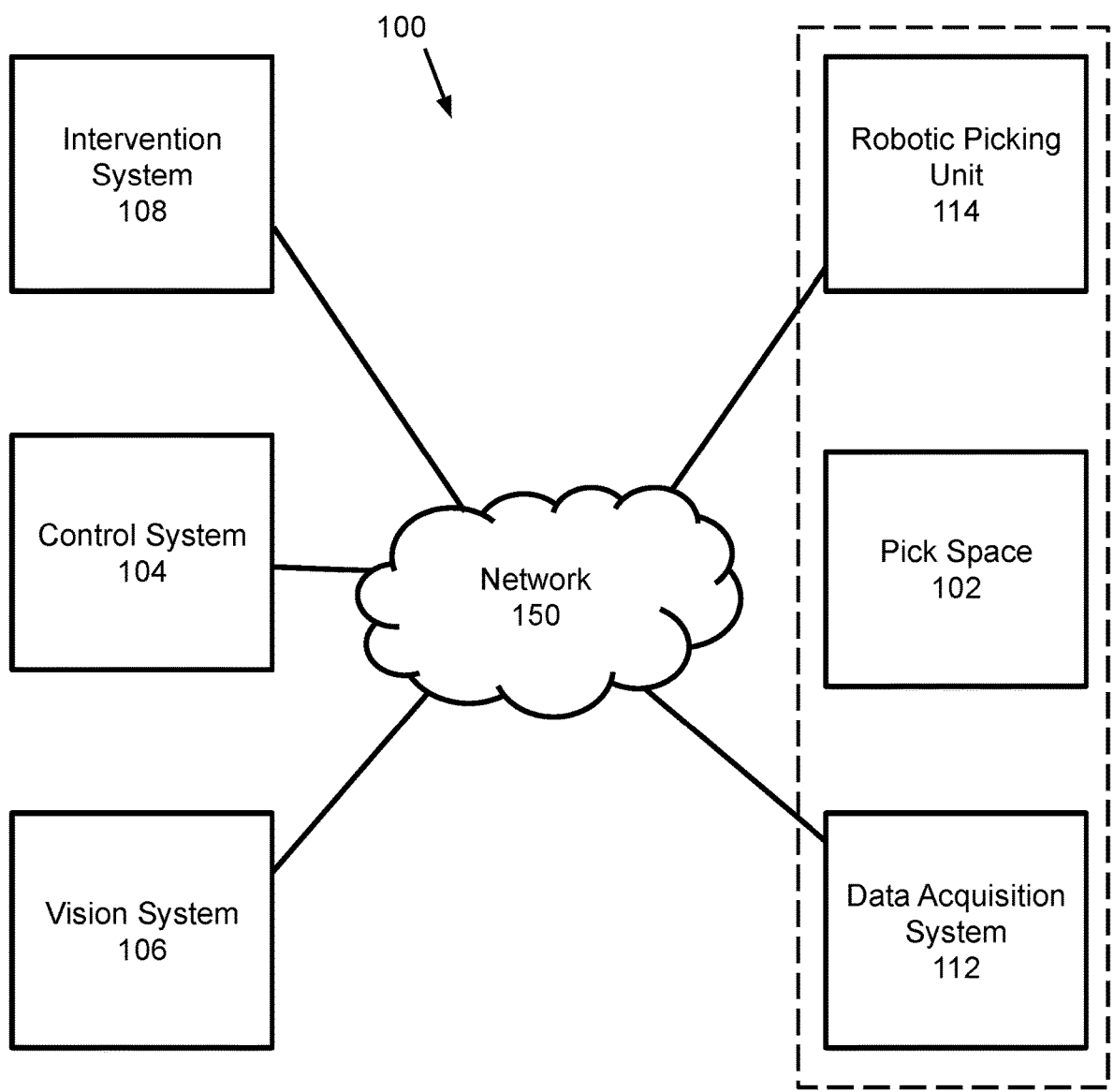
FIG. 1 illustrates an exemplary system for robotic picking in accordance with an exemplary embodiment of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1 illustrates an exemplary embodiment of a robotic picking system 100 according to one embodiment. The system 100 comprises a pick space 102, robotic picking unit 114, data acquisition system 112, vision system 106, intervention system 108, control system 104, and a network 150 over which the various systems communicate and interact. The various computing devices described herein are exemplary and for illustration purposes only. The system may be reorganized or consolidated, as understood by a person of ordinary skill in the art, to perform the same tasks on one or more other servers or computing devices without departing from the scope of the invention.

Pick space 102 generally represents the environment where object picking, movement and placement operations occur. The inventive concepts disclosed herein are applicable to any conceivable pick space. Exemplary pick spaces may comprise an area where objects are moved from one location to another. For example, pick space 102 may comprise at least one of a pallet, container, bin, conveyor belt, rack, shelves, etc. (and/or a plurality of these) from which objects may be picked or to which objects may be placed. Picking and movement of objects within a pick space 102 may occur via automated robot assistance and/or with human assistance (on-site or remote human assistance). The inventive concepts disclosed herein are further applicable to any robot based application where it is desirable to override a first (e.g. default) operational configuration of the robot in order to allow the robot to perform actions which would not be possible under the constraints of the first configuration.

Robotic picking unit 114 generally comprises a system of components that operate to perform robotic manipulation and movement of objects. An exemplary robotic picking unit 114 comprises at least one robotic arm with an end effector for picking and moving objects. Robotic arm may comprise a multi-jointed, multi-degree of freedom arm capable of reaching a plurality of three dimensional locations. End effector may comprise a variety of grip elements such as suction cups, claws, pincers, lifting/scooping elements, pushing/pulling elements, or other manipulation components suitable for manipulating and moving objects as would be apparent to a person of ordinary skill in the art. Robotic picking unit 114 is configured to perform picking operations under a variety of operational paradigms. These operational paradigms may generally be classified as automated (computer based decision making) or semi-automated (some human involvement in decision making). Thus, the robotic picking unit 114 performs automated and/or semi-automated robotic picking operations under guidance from at least one external system comprising at least one of the vision system 106, control system 104, and intervention system 108. The inventive concepts disclosed herein are applicable to any robot and the robotic picking unit discussed here is merely for exemplary purposes.

Data acquisition system 112 comprises a system of components that operate to obtain data associated with pick space 102. Data acquisition system 112 obtains data associated with the pick space 102 including at least data associated with picking and placement locations and objects within the pick space 102. By way of example and not limitation, the data acquisition system 112 may include at least one 2-D camera system and/or 3-D camera system configured to capture data associated with the pick and/or placement locations and/or objects associated with the pick space 102. The data acquired by the 2-D camera system and/or the 3-D camera system may be referred to as 2-D image data and/or 3-D image data.

Vision system 106 generally comprises a system of components that operate to identify control instructions or pick interaction data for picking an object within the pick space 102, said pick data suitable for use by a robotic arm or end effector to pick and move an identified object. In some embodiments, the vision system 106 employs a trained machine learning model in order to identify pick interaction data and operates autonomously to provide control instructions or pick interaction data to robotic picking unit 114. In one aspect, vision system 106 analyzes 2D and/or 3D image data of a pick space 102 to identify pick interaction data. In some embodiments, the vision system is limited to performing autonomous pick identification and pick interaction data within a certain operational paradigms such as a limited pick area (e.g. less than the full reachable volume of the robotic picking unit such as limited to a pallet within the pick space 102) or other limited operational paradigms (e.g. force, torque, speed, acceleration limits which are less than capabilities of the robotic picking unit). These limited pick areas or operational paradigms may be determined as a function of the different operational configurations loaded onto the robotic picking unit or available to be provided to robotic picking unit 114 via control system 104, as discussed in more detail below. In some scenarios, the vision system 106 is unable to identify pick interaction data or the pick data identified by the vision system is insufficient to execute a picking operation (e.g. the robotic arm is unable to act on the identified pick data). In some aspects, vision system 106 is configured to identify potential pick objects and/or pick interaction data outside of a limited pick area, however may not indicate such as confirmed or actionable pick data without confirmation from an intervention system or other human in the loop interaction. When these scenarios arise, a human-in-the-loop ("crew chief") is called on, via remote intervention system 108, to provide human generated data to aid picking operations. The interaction and oversight control between these systems is coordinated by control system 104 as discussed in more detail below.

Intervention system 108 generally comprises a system that operates to allow a human-in-the-loop to provide control instructions or pick interaction data to assist with picking operations. In general, intervention system 108 is called upon by vision system 106 or other appropriate system to aid in determining control instructions or pick interaction data when vision system 106 requires assistance or is called upon by control system 104 to aid in determining pick interaction data for picking operations which are beyond the scope of operational paradigms associated with autonomous picking and require human-in-the-loop decision making. For example, in some aspects, robotic picking unit 114 is prevented from accessing certain locations within a pick space, exceeding certain forces, torques, speeds, accelerations, etc. unless intervention system 108 is invoked to provide an override of the operational configuration constraining the robotic picking unit 114.

Control system 104 generally receives information associated with robot operations and/or object interactions from other system 100 components including at least one of vision system 106, intervention system 108, data acquisition system 112, and robotic picking unit 114, processes the received information to determine an operational configuration/paradigm and provides information associated with control of the robotic picking unit 114. Control system 104 is operable to at least one of obtain information related to overriding a default configuration of a robotic control system and/or robot, validate information associated with the override, and communicate necessary override information to a robotic control system and/or robot. Control system 104 is operable to at least one of obtain override requests, switch from a default operating configuration to an override configuration, obtain override control instructions, assign pick tag data to obtained override control instructions based on the source of the override control instructions, obtain validation of the override control instructions, generate override switching instructions, and provide at least one of the override control instructions and override switching instructions to the robotic control system and/or robot. In one aspect, control system 104, or portions thereof, may be incorporated into at least one of intervention system 108, vision system 106, and robotic picking unit 114.

In some aspects, control system 104 receives information associated with pick interactions wherein additional intervention is not required. For example, in some scenarios, control system 104 receives pick interaction data from vision system 106 which has determined pick interaction data with a degree of certainty such that control system 104 can simply relay the information to robotic picking unit 114 without additional intervention. In these scenarios, vision system 106 is identifying pick interaction data within the confines of an operational paradigm associated with robotic picking unit 114 that is deemed safe for autonomous picking without further interaction. In another example, vision system may be unable to determine pick interaction data with a required degree of certainty in which case intervention system 108 provides supplemental pick interaction data to vision system 106 and/or control system 104 to allow autonomous picking operations to continue, which again does not require additional intervention and involves an operational paradigm associated with robotic picking unit 114 that is deemed safe for autonomous picking without further interaction.

In some aspects, control system 104 receives information associated with pick interactions wherein additional intervention is required. For example, in some scenarios, control system 104 receives data from at least one of a vision system and an intervention system, however such pick interaction data are associated with picking operations outside of the operational paradigm within which the vision/intervention system are allowed to operate autonomously or semi-autonomously. Some examples of this comprise scenarios where objects have fallen or been knocked over (e.g. off a pallet, conveyor belt, rack, etc.) or for other reasons are in the pick space, outside of a location deemed accessible by the operational configuration of a robotic picking unit 114, yet still within reach of the robotic picking unit 114, or require operational parameters (e.g. force, torque, speed, acceleration, etc.) which would exceed the established operational paradigm for autonomous picking operations. In these scenarios control system 104 receives pick interaction data from intervention system 108, determines the need to override an operational configuration of the robotic picking unit 114 and optionally determines and provides an additional operational configuration to be used in association with this pick interaction data. In some embodiments associated with these scenarios, control system 104 receives an indication from vision system 106 that there may be potential pick objects located outside of the vision system's autonomous operational confines. These different scenarios are discussed in more detail below with respect to FIGS. 2B-2F.

In some aspects, control system 104 is operable to be triggered by a human initiated command and provide operational control instructions or paradigm shift instructions in accordance with the human initiated command. For example, control system 104 may comprise an interface through which a user provides an operational configuration or override instruction, which control system 104 then provides to a robotic picking unit. Although described herein in association with control system 104, alternative means of providing human initiated commands to robotic picking unit are included such as via direct interface with a robotic picking unit or via another system or external component, without departing from the scope of the invention.

Although depicted herein as a separate system, control system 104 may be incorporated into any of the subsystems or subcomponents of robotic picking system 100 or as part of another system without departing from the scope of the invention. By way of example and not limitation, control system 104 may be implemented as an on-site system, located on a remote server, incorporated into robotic picking unit 114, incorporated into vision system 106, etc.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various clients devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2A:
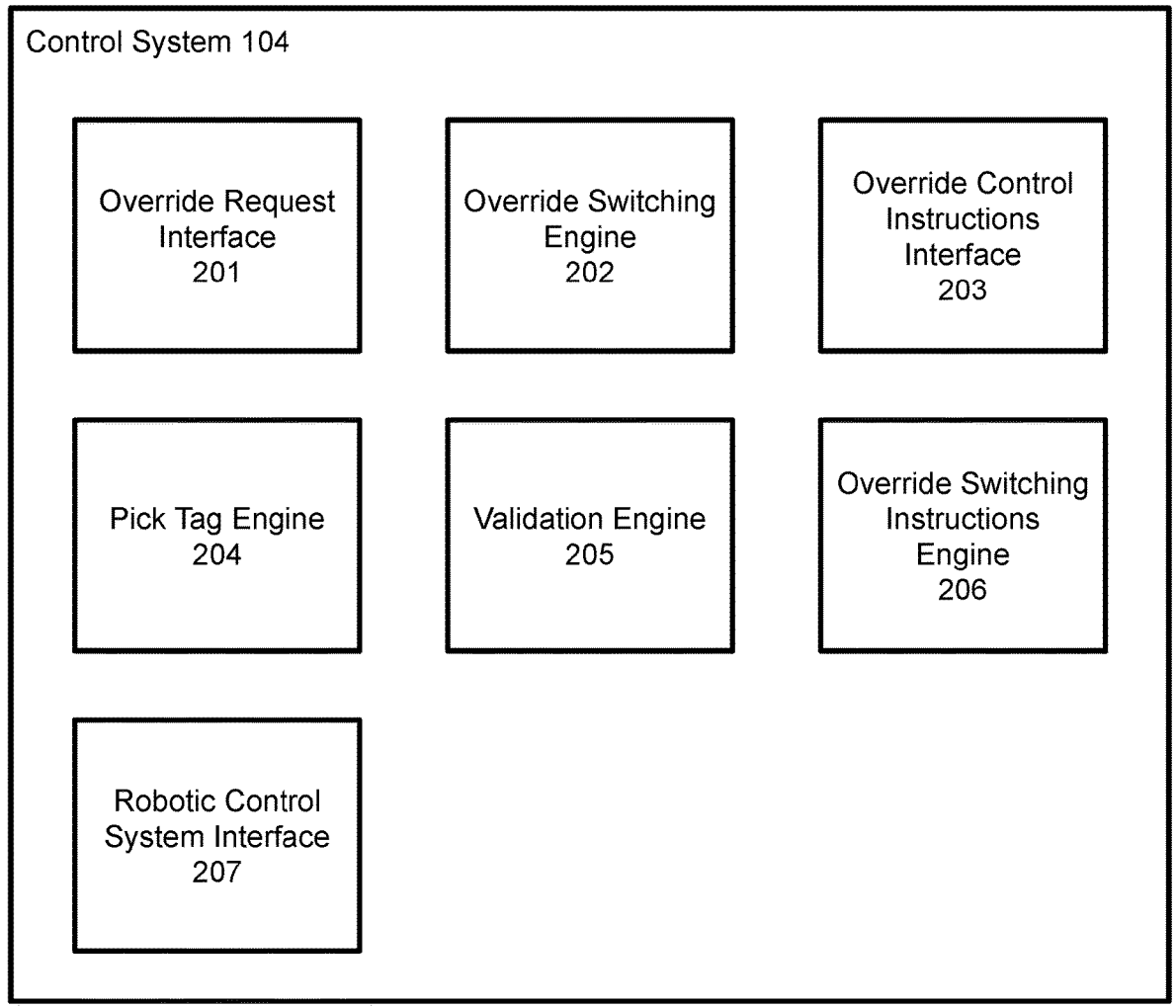
FIG. 2A illustrates a control system for determining operational paradigms in accordance with an exemplary embodiment of the present invention.

FIG. 2A illustrates an exemplary embodiment of the control system 104 comprising override request interface 201, override switching engine 202, override control instructions interface 203, pick tag engine 204, validation engine 205, override switching instructions engine 206, and robotic control system interface 207. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met. Additional aspects of the control system 104 and its subcomponents can be found in the discussion of the exemplary process of FIG. 3 and the discussion of the example scenarios of FIGS. 2B-2F.

Override request interface 201 is operable to obtain an override request to override a default operational configuration. The override request may be obtained from at least one of a vision system (e.g. vision system 106) and an intervention system (e.g. intervention system 108). In one aspect, the override request is associated with an object that cannot be processed by a robot using the default configuration. The override request may comprise an identification of the object that cannot be process under the default configuration.

Override switching engine 202 is operable to switch between default and override configurations in order to obtain additional control instructions for executing operations which would not be allowed under the default configuration. In one aspect, override switching engine 202 switches to the override configuration in order to obtain additional instructions for processing objects which cannot be processed under the default configuration. In one aspect, switching comprises allowing for the input of control instructions which exceed operational limits of the default configuration including, but not limited to, at least one of an operational boundary, an operational acceleration, an operational speed, an operational force, an operational torque, an operational range of motion of the robot, an operational positioning of the robot, and an operational orientation of the robot.

Override control instructions interface 203 is operable to obtain override control instructions in accordance with the switch to the override configuration as performed by the override switching engine 202. In one aspect, obtaining override control instructions comprises a selection of additional and/or alternate control instructions from a list or database of control instructions. In one aspect, override control instructions comprise at least one of vision system generated and intervention system generated (e.g. via human input) control instructions. In one aspect, override control instructions may comprise pick interaction data including, but not limited to, at least one of pick object location/coordinates (2D and/or 3D), pick object shape, pick object size/dimensions, pick object weight, etc. In one aspect, the override control instructions would enable a robot to exceed at least one limitation of the default configuration, including, but not limited to operational limitations associated with an operational boundary, an operational acceleration, an operational speed, an operational force, an operational torque, an operational range of motion of the robot, an operational positioning of the robot, and an operational orientation of the robot.

Pick tag engine 204 is operable to assign pick tag data to the obtained override control instructions based on the source of the override control instructions. In one aspect, a first tag is assigned to override control instruction obtained from the vision system, a second tag is assigned to override control instruction obtained from a combination of the vision system and the intervention system, and a third tag is assigned to override control instructions obtained from the intervention system. In one aspect, the pick tag data may comprise an identifier indicative of the user associated with an intervention system that provided the override control instructions.

Validation engine 205 is operable to validate the override control instructions. In one aspect, validation engine 205 validates the override control instructions as a form of safety check prior to allowing the robot to operate in an override configuration. In one aspect, validation engine obtains a validation for each obtained control instruction. In one aspect, validation engine obtains a validation source identifier such as an identifier associated with a user and/or intervention system providing the validation. In one aspect, validation engine 205 obtains a first validation for a first control instruction (or set of instructions) and a second validation for a second control instruction (or set of instructions) where the first and second validations are different. For example, the first control instruction may require validation by a user with a certain level of user certification or more experience than that required by the second control instruction. In one aspect, validation engine 205 may obtain multiple validations such as validation by a first user and a second user (e.g. a junior user and a supervisor, multiple users for redundancy purposes).

Override switching instructions engine 206 is operable to generate override switching instructions for controlling the switch from the default configuration to the override configuration. In one aspect, override switching instructions comprise instructions for allowing control instructions which disobey limitations of the default configuration to be communicated to a robotic control system associated with a robot such as via robotic control system interface 207. In one aspect, override switching instructions comprise instructions for use by a robotic control system to switch to an override configuration (e.g. a preloaded configuration in the robotic control system and/or robot) in order to allow the robot to operate under a different operational paradigm.

Robotic control system interface 207 is operable to communicate at least one of override switching instructions and override control instructions to a robotic control system associated with a robot. In one aspect, robotic control system interface 207 operates in real-time to provide instructions as they become available (e.g. are obtained) in such a manner that the robot is enabled to continue an existing operation without the need to pause or interrupt operations in order to be reconfigured (e.g. reprogrammed) to operate in the override configuration.

FIGS. 2B-2F illustrate various scenarios associated with examples of overriding a robot to operate under an alternate operational paradigm in accordance with an exemplary embodiment of the invention.

Figure 2B:
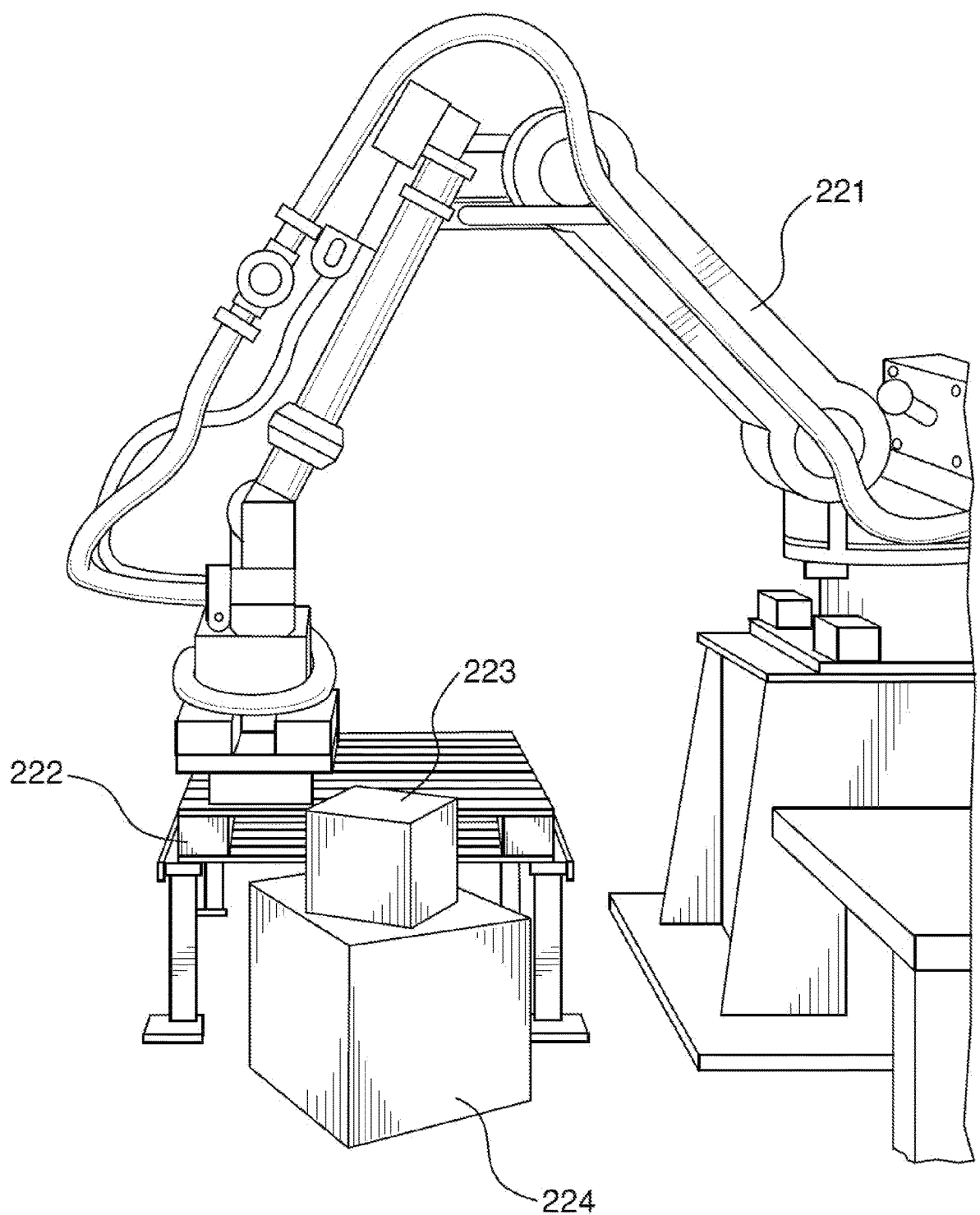
FIGS. 2B-2F illustrate various scenarios associated with examples of overriding a robot to operate under an alternate operational paradigm in accordance with an exemplary embodiment of the invention.

FIG. 2B illustrates an exemplary scenario of a robot 221 (a robotic arm in this example) picking an object from pallet 222. This scenario is representative of a first operational configuration (e.g. a default configuration) of robot 221 wherein the robot 221 is limited to performing picking operations on objects located on the pallet 222. In other words, robot 221 is unable to process objects outside of the footprint of the pallet 222, such as objects 223 and 224 located on the floor adjacent to the pallet.

Figure 2C:
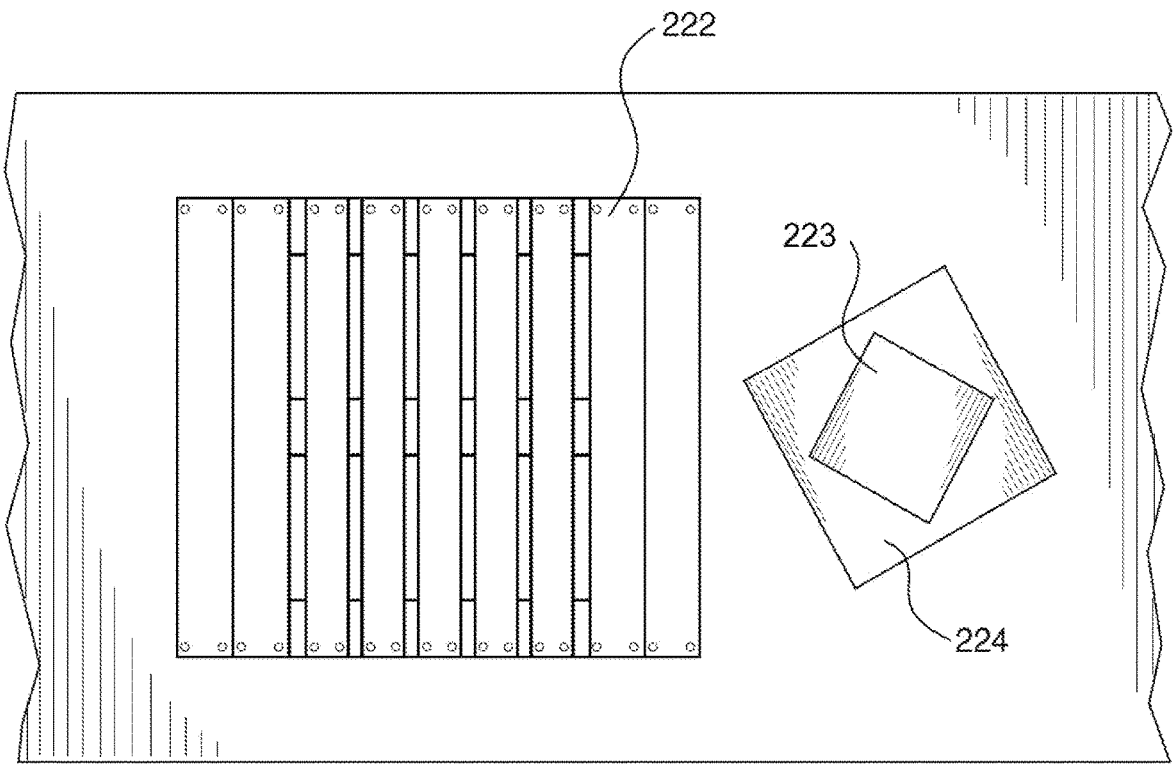
Figure 2C:
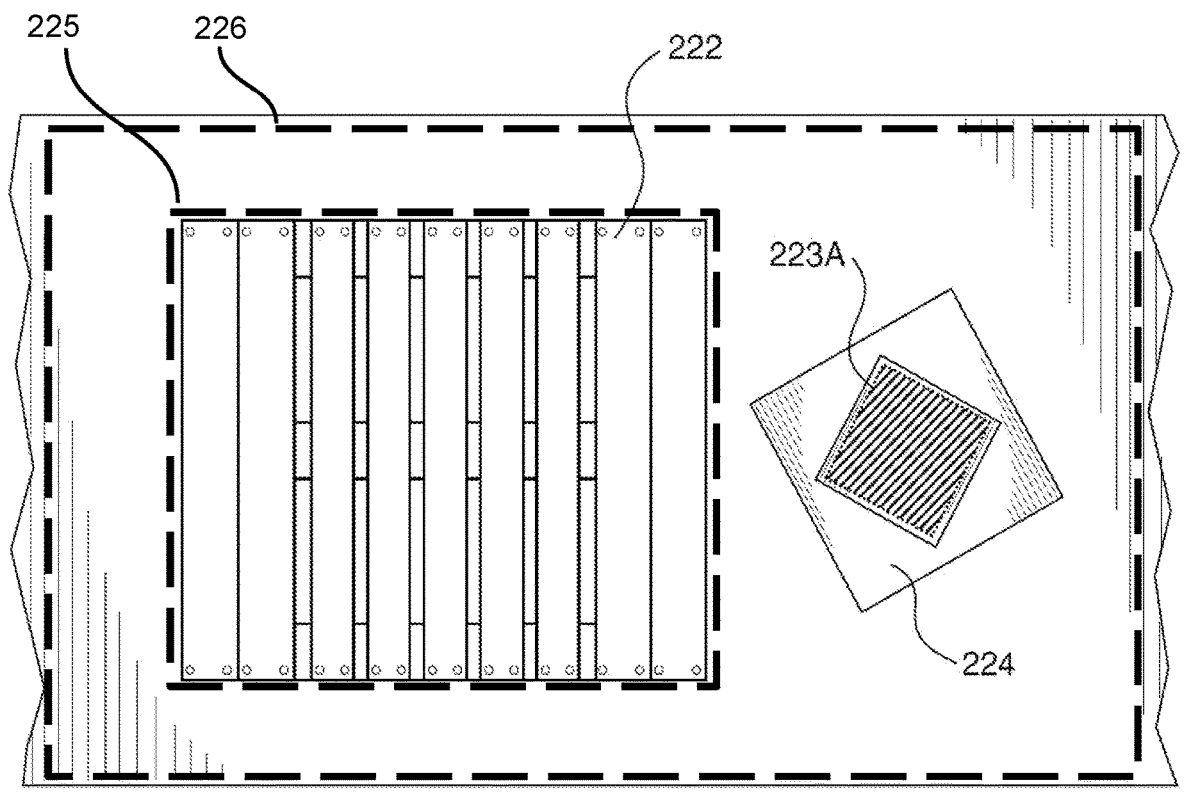

FIG. 2C (a) illustrates an exemplary top down or overhead view of objects 223 and 224 positioned on the floor adjacent to pallet 222. In one aspect, this top down or overhead view depicted in FIG. 2C (a) is representative of an image captured by a data acquisition system, such as data acquisition system 112 of FIG. 1. FIG. 2C (b) illustrates an exemplary arrangement of the operational limits of a robot under the exemplary default configuration as represented by box 225. In this scenario, the robot is unable to process objects located outside of the area represented by box 225 which is indicative of the operational limits (e.g. area, volume) within which a robot may interact with objects (e.g. default configuration is limited to interactions within the pallet footprint). As objects 223 and 224 are located outside of the area represented by box 225, the robot, due to its operational configuration is prevented from interacting with the objects even though they are within the robot's reach capabilities. Box 226 represents exemplary operational limits of a second operational configuration (e.g. an override configuration, an unconstrained configuration, the maximum reachable area/volume of the robot as limited by spatial constraints (e.g. walls, etc.)) which may be used, when the need arises, in order to interact with objects which cannot be processed using the default configuration.

In one aspect, FIG. 2C (b) may be representative of an exemplary graphical user interface (GUI) which may be displayed, such as via an intervention system (e.g. intervention system 108 of FIG. 1), such that a user may initiate an override request. For example, a user, upon viewing a GUI depicting that shown in FIG. 2C (b), may identify pick interaction data such as by outlining or otherwise identifying at least a portion of object 223 as representative by object identifier box 223A. In one aspect, the user may first initiate an override request, then create object identifier box 223A. In one aspect, the user may create object identifier box 223A which automatically initiates an override request. Alternatively or in addition, outline or object identifier box 223A may be determined automatically by a vision system, such as vision system 106, and presented to a user via this GUI such as via an intervention system (e.g. intervention system 108). In this scenario, the vision system may initiate an override request based on objects the vision system identifies that are within reach of the robot, but outside of an operational configuration (e.g. a default configuration).

Figure 2D:
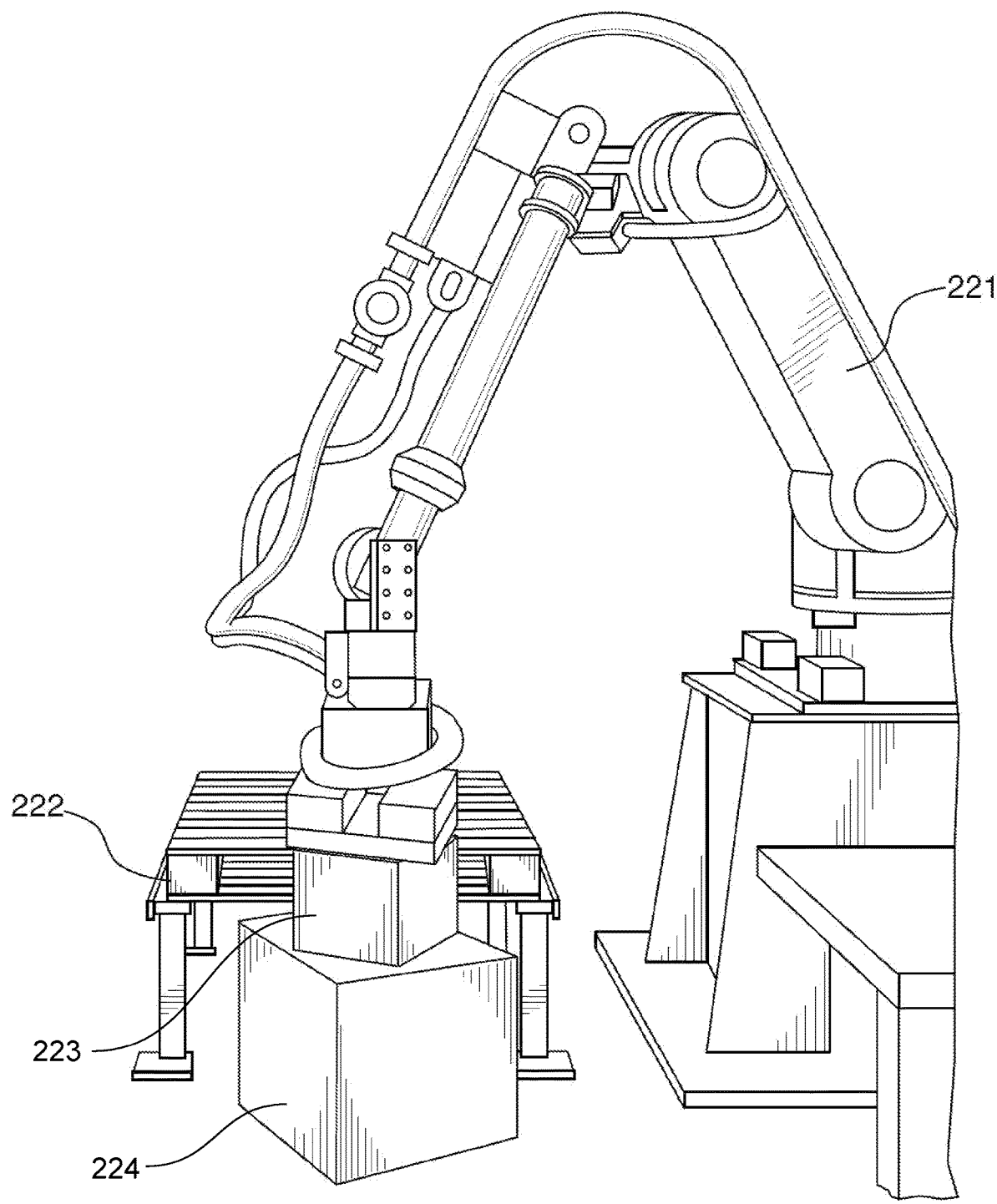

FIG. 2D illustrates an exemplary scenario of robot 221 operating in accordance with an override configuration in order to process objects which it would otherwise be unable to process under the default configuration (e.g. when limited to interacting with objects on pallet 222). In this scenario, when the override configuration is activated or authorized, robot 221 is operable to interact with objects outside of an area limited by the default configuration. The operation depicted in FIG. 2D may occur based on pick interaction data obtained as discussed with respect to FIG. 2C (b) above, such as vision system generated pick interaction data and/or intervention system based pick interaction data. For example, the identification of object 223 via identifier box 223A may be processed by at least one of vision system and robot 221 in order to determine control instructions for executing the picking interaction as depicted in FIG. 2D.

Figure 2E:
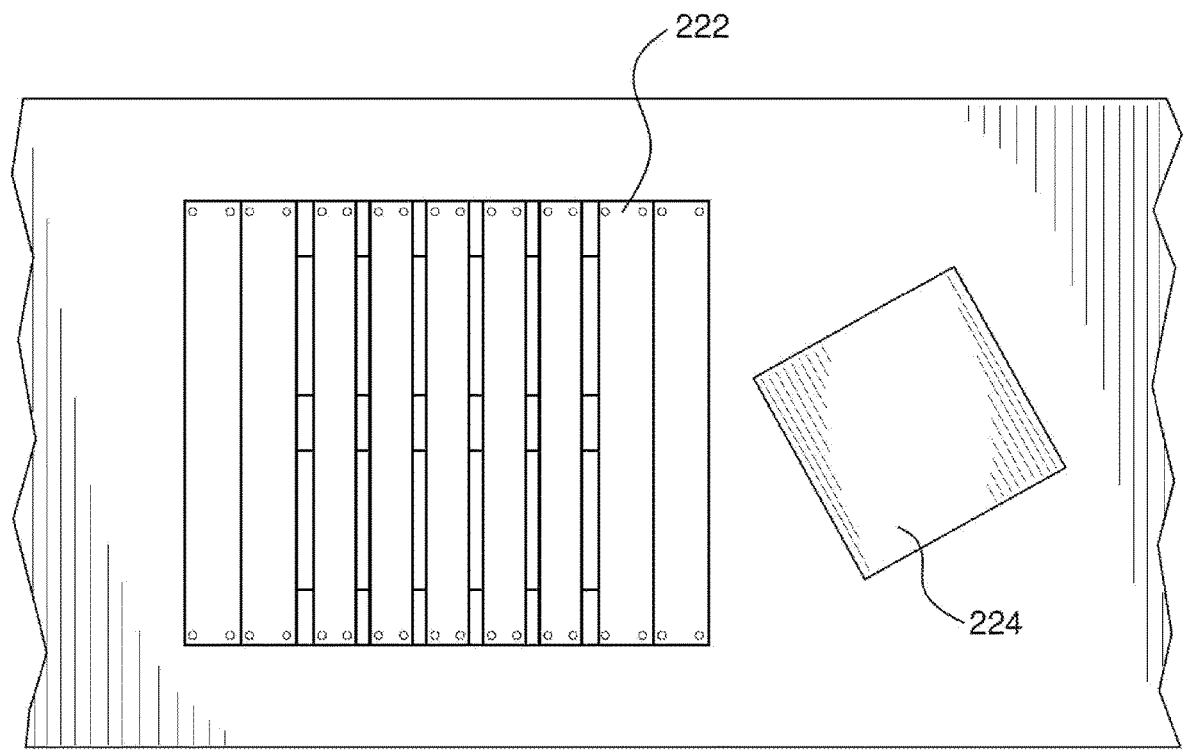
Figure 2E:
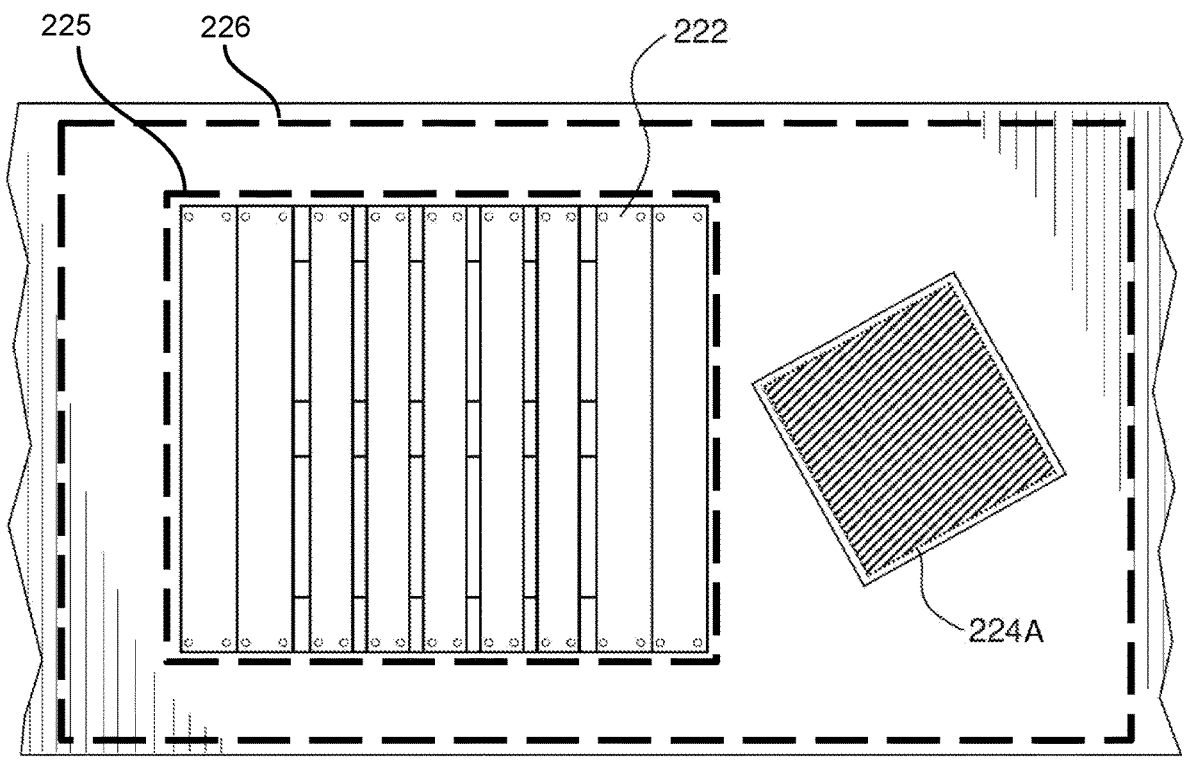

FIG. 2E illustrates an exemplary top down or overhead view of object 224, positioned on the floor adjacent to pallet 222, after object 223 has been removed from object 224 as a result of the operation discussed in FIG. 2D above. In one aspect, this top down or overhead view depicted in FIG. 2D (a) is representative of an image captured by a data acquisition system, such as data acquisition system 112 of FIG. 1. Similar to FIG. 2C (b) as discussed above, FIG. 2D (b) illustrates an exemplary arrangement of the operational limits of a robot under the exemplary default configuration as represented by box 225. In this scenario, the robot is unable to process object 224 using the default configuration due to object 224 being located outside of the area represented by box 225 which is indicative of the operational limits (e.g. area, volume) within which the robot may interact with objects under the default configuration. Box 226 represents exemplary operational limits of a second operational configuration (e.g. an override configuration, an unconstrained configuration, the maximum reachable area/volume of the robot as limited by spatial constraints (e.g. walls, etc.)) which may be used, when the need arises, in order to interact with objects which cannot be processed using the default configuration.

In one aspect, FIG. 2E (b) may be representative of an exemplary GUI which may be displayed, such as via an intervention system (e.g. intervention system 108 of FIG. 1), such that a user may initiate an override request to enable robot 221 to interact with objects outside the limits of the default configuration (as indicated by box 225). For example, a user, upon viewing a GUI depicting that shown in FIG. 2E (b), may identify pick interaction data such as by outlining or otherwise identifying at least a portion of object 224 as representative by object identifier box 224A. In one aspect, the user may first initiate an override request, then create object identifier box 224A. In one aspect, the user may create object identifier box 224A which automatically initiates an override request. Alternatively or in addition, outline or object identifier box 224A may be determined automatically by a vision system, such as vision system 106, and presented to a user via this GUI such as via an intervention system (e.g. intervention system 108). In this scenario, the vision system may initiate an override request based on objects the vision system identifies that are within reach of the robot, but outside of an operational configuration (e.g. a default configuration).

Figure 2F:
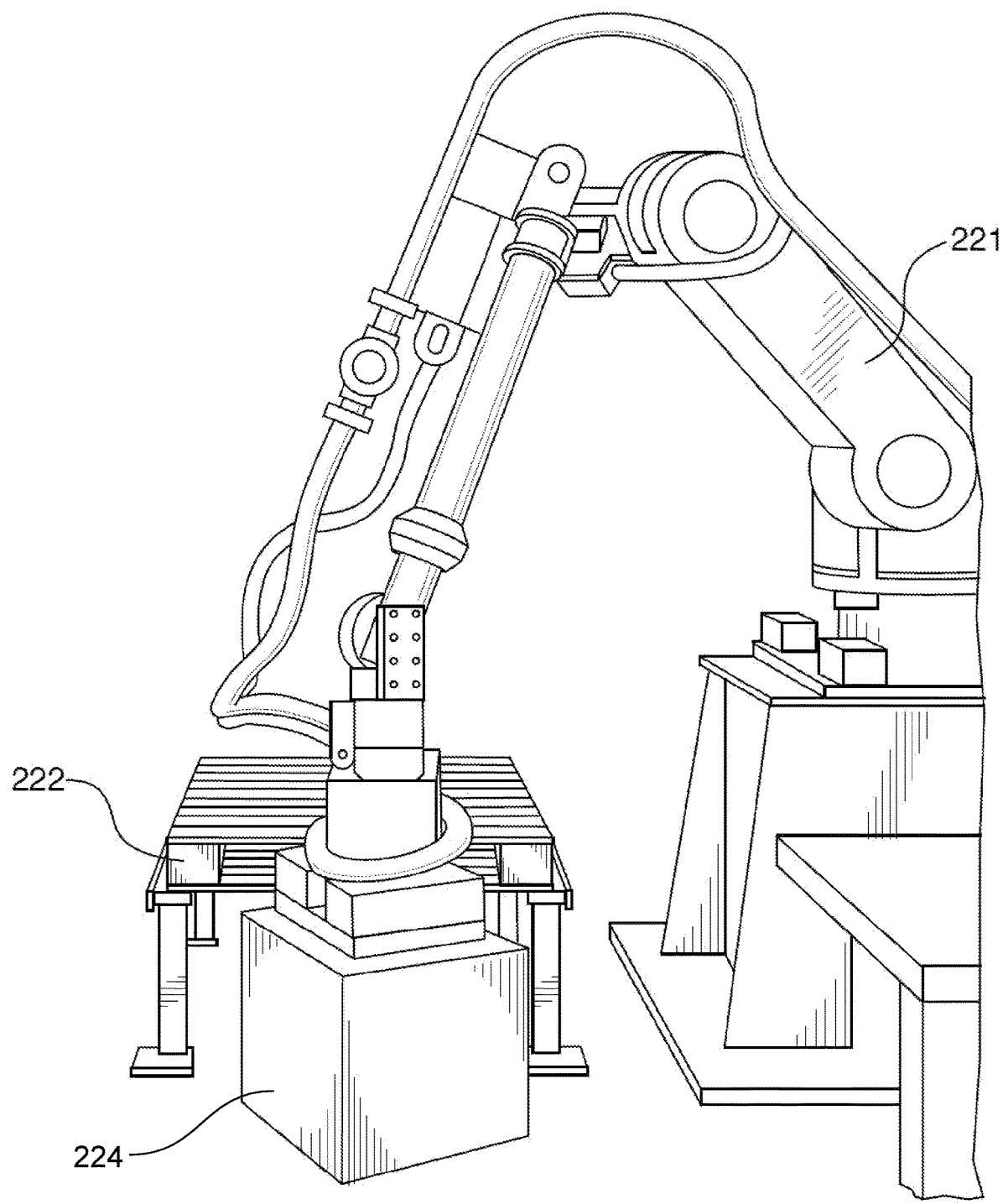

FIG. 2F illustrates an exemplary scenario of robot 221 operating in accordance with an override configuration in order to process objects which it would otherwise be unable to process under the default configuration (e.g. when limited to interacting with objects on pallet 222). In this scenario, when the override configuration is activated or authorized, robot 221 is operable to interact with objects outside of an area limited by the default configuration. The operation depicted in FIG. 2F may occur based on pick interaction data obtained as discussed with respect to FIG. 2E (b) above, such as vision system generated pick interaction data and/or intervention system based pick interaction data. For example, the identification of object 224 via identifier box 224A may be processed by at least one of the vision system and robot 221 in order to determine control instructions for executing the picking interaction as depicted in FIG. 2F.

Although the operational limits described in association with FIGS. 2B-2F are with respect to area/volume limitations (i.e. the spatial area where the robot is allowed to reach), the default configuration may limit other operational aspects of the robot including, but not limited to, at least one of operational force, operational torque, operational range of motion of the robot, operational positioning of the robot, and operational orientation of the robot. With these aspects a similar approach would apply in that a request to override the default configuration would be initiated, followed by obtaining and/or generating pick interaction data corresponding to the override configuration, and communication of appropriate control instructions to the robot. In one aspect, the robot may be configured with an on-board default configuration and at least one override configuration and receives an instruction to switch from the default configuration to one of the override configurations. In one aspect, the robot may be configured in an unconstrained manner to act in accordance with any control instructions received. In this scenario the switching from a default configuration to an override configuration is performed on the software side (or control system based) prior to sending control instructions to the robot.

Figure 3:
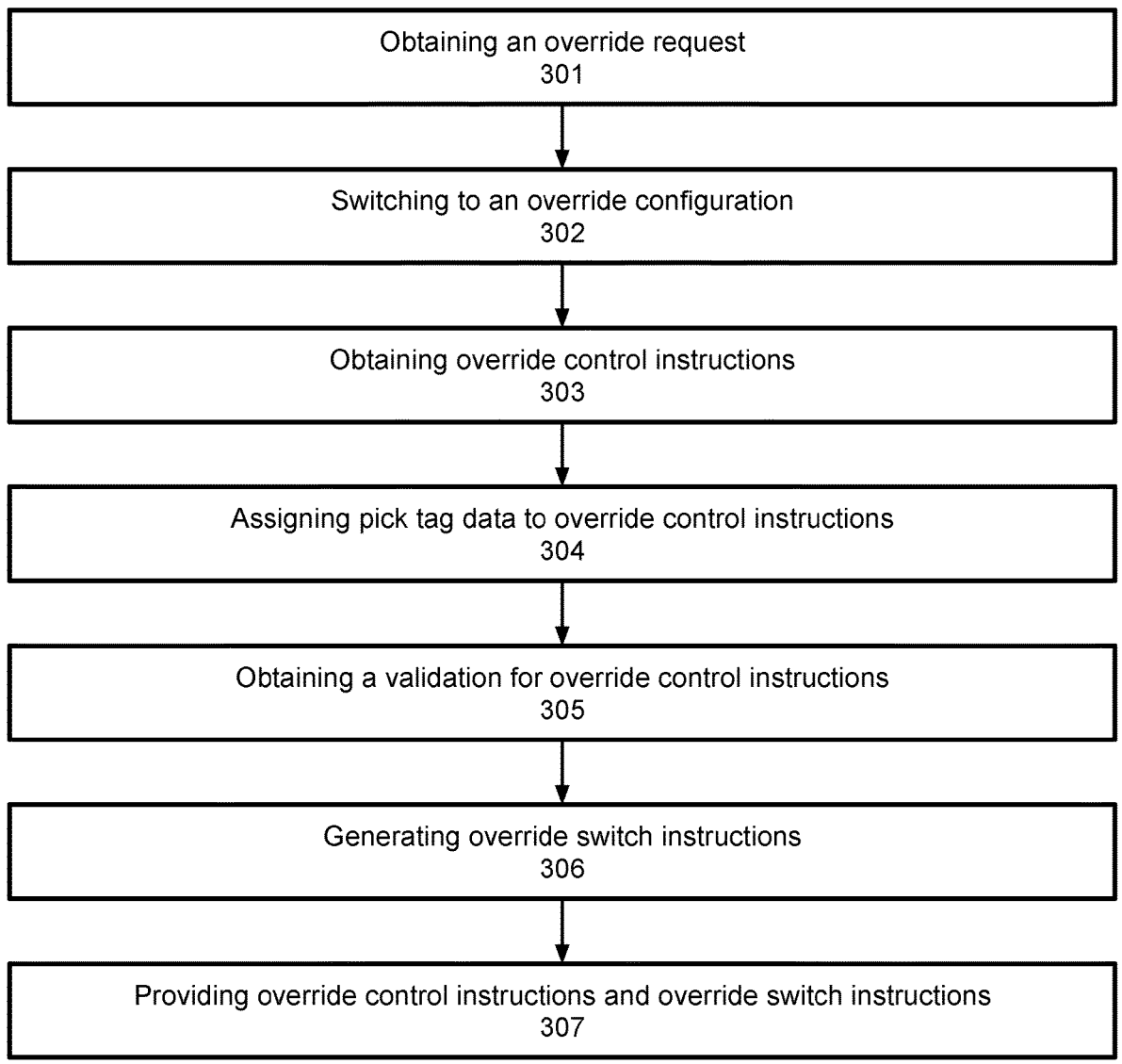
FIG. 3 illustrates an exemplary process for determining operational paradigms according to one embodiment of the invention.

FIG. 3 illustrates an exemplary process for providing override control instructions to a robotic picking system based on the source of the pick interaction data, in accordance with one embodiment of the invention. The process comprises obtaining an override request 301, switching to an override configuration 302, obtaining override control instructions 303, assigning pick tag data to override control instructions 304, obtaining a validation for override control instructions 305, generating override switch instructions 306, providing override control instructions and override switch instructions 307. The exemplary process may be performed in association with at least one control system, such as control system 104 of FIGS. 1-2. The process may comprise additional steps, fewer steps, and/or a different order of steps without departing from the scope of the invention as would be apparent to one of ordinary skill in the art.

At step 301, the process comprises obtaining an override request. The override request may be obtained from at least one of a vision system and an intervention system, such as those discussed in FIG. 1 above. The override request may comprise identification of an object that cannot be processed based on a default configuration available to a robotic control system. In one aspect, a vision system may identify an object automatically as part of processing pick space data (e.g. 2D image data, 3D depth data) obtained from a data acquisition system (such as that described above in FIG. 1). The identifying by the vision system may comprise determining that the identified object is, for example, outside of a designated area of operation associated with the default configuration or determining that the identified object requires, for example, a force in excess of an operational limit associated with the default configuration in order to process the object (e.g. interact with the object to at least one of pick, move, and place the object). In one aspect, a human-in-the-loop, via interaction with an intervention system, may identify an object that cannot be processed based on a default configuration. For example, as discussed above with respect to FIG. 2, a GUI may be presented to a user wherein the user may initiate an override request by at least one of selecting an override option presented on the GUI and selecting an object outside of the operational limits (e.g. area/volume) of the default configuration (which may automatically trigger an override request).

At step 302, the process may comprise switching to an override configuration. In one aspect, upon receiving an override request, a switch may be made from the default configuration to the override configuration thereby enabling the identification of additional instructions for use in controlling robot operations. The switching is executed by at least one of an automatic switch and via human input (e.g. via intervention system). In one aspect, a vision system may automatically switch to an override configuration in order to identify (e.g. select, determine, provide, etc.) additional instructions associated with operations under an override configuration (e.g. exceeding the operational limits of a default configuration). In one aspect, user input via an intervention system may trigger a switch from the default configuration to the override configuration thereby enabling the user to identify (e.g. select, determine, provide, etc.) additional instructions associated with operations under the override configuration (e.g. exceeding the operational limits of the default configuration).

At step 303, the process may comprise obtaining override control instructions. The override control instructions comprise at least one aspect which cannot be performed or processed in the default configuration. The override control instructions may be obtained in association with the additional instructions enabled as part of the switching to an override configuration at step 302. In one aspect, the override control instructions comprise intervention system generated instructions, such as user generated instructions provided via intervention system. In one aspect, the override control instructions comprise vision system generated instructions which have been at least one of reviewed and confirmed (e.g. validated, approved, etc.) via an intervention system. In one aspect, the override control instructions comprise a combination of vision system generated instructions supplemented by user generated instructions provided via an intervention system (e.g. user modification of vision system generated instructions, user generated additional instructions to augment the vision system generated instructions). The override control instructions may comprise instructions to alter at least one operational limit of the default configuration, including, but not limited to at least one of an operational boundary, an operational acceleration, an operational speed, an operational force, an operational torque, an operational range of motion of the robot, an operational positioning of the robot, and an operational orientation of the robot.

At step 304, the process may comprise assigning pick tag data to each of the obtained override control instructions. The pick tag data indicates a source of each obtained override control instruction. For example, a first pick tag may be assigned to override control instructions obtained from a vision system, a second pick tag assigned to override control instructions obtained from a combination of a vision system and an intervention system, and a third pick tag assigned to override control instructions obtained from an intervention system. In one aspect, assigning pick tag data comprises assigning, or otherwise associating, an identifier with the pick tag and corresponding obtained override control instructions, where the identifier provides an indication of at least one of the vision system, the intervention system, and the user that provided the override control instructions.

At step 305, the process may comprise obtaining at least one validation for the obtained override control instructions.

In one aspect, obtaining at least one validation may comprise obtaining at least one validation for each obtained override control instruction. In one aspect, each validation may be associated with a validation source identifier which may be stored for tracking of validation histories. Obtaining at least one validation may comprise at least one of obtaining the validation automatically and obtaining the validation via human input. For example, when override control instructions are generated via intervention system (e.g. by a human-in-the-loop), the override control instructions may be automatically validated because the source is human generated. In one aspect, when override control instructions are obtained from a vision system (or vision system generated), the override control instructions may be validated via human input to ensure that the automatically generated override control instructions are appropriate for use in executing associated robot operations. In one aspect, each override control instruction may require a plurality of validations. For example, override control instructions validated by a first user may require validation by a second user in order to be deemed appropriate for use in robotic operations. In one aspect, different override control instructions may require different validations, such as override control instructions associated with a first override configuration may require a first validation, while override control instructions associated with a second override configuration may require a second validation. For example, the amount by which the override control instructions exceed the default configuration may serve as an indicator whether the validation requires a first validation and/or a second validation. For example, if the override control instructions exceed the default configuration by a threshold amount, a validation by a supervisor or user with a certain level of experience and/or certification may be required, while override control instructions exceeding the default configuration by less than the threshold amount may be validated by junior personnel or users with lower levels of experience and/or certification.

At step 306, the process may comprise generating override switching instructions. In one aspect, the generated override switching instructions comprise instructions to switch from one preloaded configuration to another preloaded configuration. For example, the robot and/or corresponding robotic control system may be configured with an on-board default configuration and at least one override configuration and override switching instructions comprise instruction(s) to switch from the default configuration to one of the override configurations. In one aspect, the generated override switching instructions comprise allowing the robot to be provided with control instructions which exceed the default configuration. For example, the robot and/or corresponding robotic control system may be configured in an unconstrained manner to act in accordance with any control instructions received while the default configuration imposes limitations on what control instructions can be communicated by a control system. In this scenario, the override switching instructions comprise instructions enabling the control system to communicate override control instructions which exceed at least one operational limit of the default configuration to the robot and/or corresponding robotic control system. In one aspect, the override switching instructions comprise instructions to return (or switch back) to the default configuration after the associated override control instructions have been executed. In one aspect, the override switching instructions comprise instructions to maintain the override configuration until instructed otherwise (e.g. new switching instructions are provided).

At step 307, the process may comprise providing at least one of the override control instructions and override switching instructions. In one aspect, the providing comprises providing the override control instructions and override switch instructions to a robotic control system for use in enabling an associated robot to operate in accordance with the override configuration and exceed at least one aspect (e.g. limitation) of the default configuration. In one aspect, the provided at least one of override control instructions and override switching instructions enable a robot associated with the robotic control system to process an object that cannot be processed based on the default configuration. In one aspect, the providing occurs in real-time, such as during an ongoing robotic operation session such that a robot is enabled to continue performing automated operations while additionally addressing circumstances require an override of the default configuration, without requiring a pause or interruption of the automated robot operations. In one aspect, providing the at least one of the override control instructions and override switching instructions is performed such that the robot is enabled to interleave the provided control instructions and/or the generated override switching instructions with control instructions from other sources or with control instructions associated with an existing object processing plan.

Although the operational limits described in association with the process of FIG. 3 are generally associated with area/volume limitations (i.e. the spatial area where the robot is allowed to reach), the default configuration may limit other operational aspects of the robot including, but not limited to, at least one of operational force, operational torque, operational range of motion of the robot, operational positioning of the robot, and operational orientation of the robot. With these aspects a similar approach would apply in that a request to override the default configuration would be initiated, followed by obtaining and/or generating pick interaction data corresponding to the override configuration, and communication of appropriate control instructions to the robot Although described herein with respect to robotic picking, the techniques disclosed herein may be applied to various other robotic environments in order to adjust the operational paradigms of robots(s) as would be apparent to one of ordinary skill in the art, and need not be limited to robotic picking applications.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). Any of the above mentioned systems, units, modules, engines, controllers, components or the like may be and/or comprise hardware and/or software as described herein. For example, the control system 104 and subcomponents thereof may be and/or comprise computing hardware and/or software as described herein in association with FIGS. 4-7. Furthermore, any of the above mentioned systems, units, modules, engines, controllers, components, interfaces or the like may use and/or comprise an application programming interface (API) for communicating with other systems units, modules, engines, controllers, components, interfaces or the like for obtaining and/or providing data or information. Any of the above mentioned systems, units, modules, engines, components or the like may be and/or comprise hardware and/or software as described herein.

Figure 4:
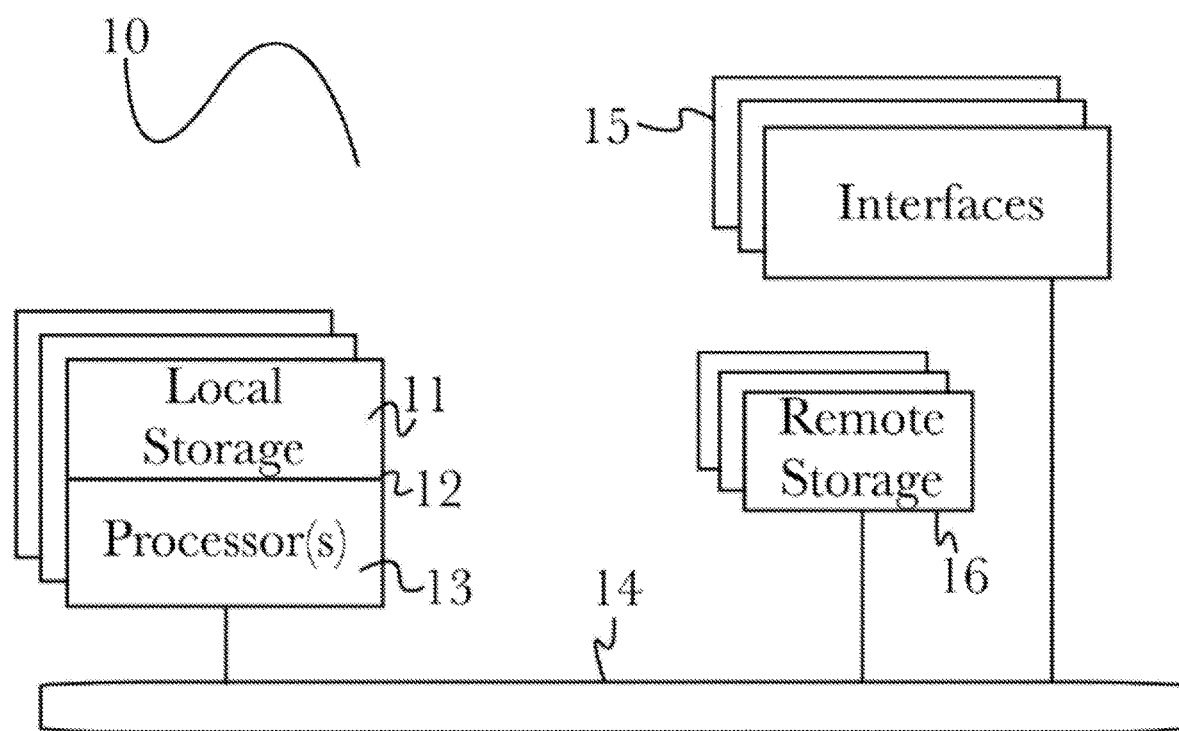
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
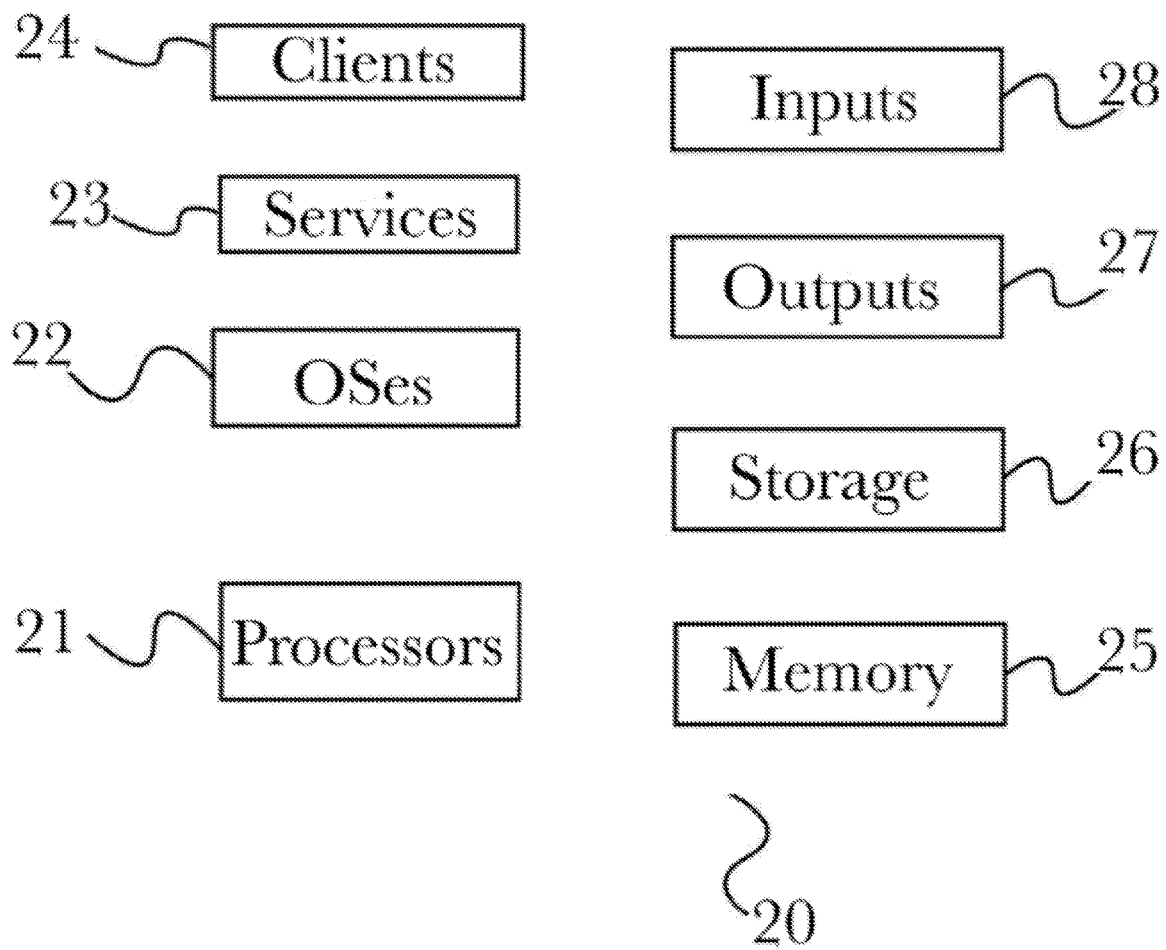
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
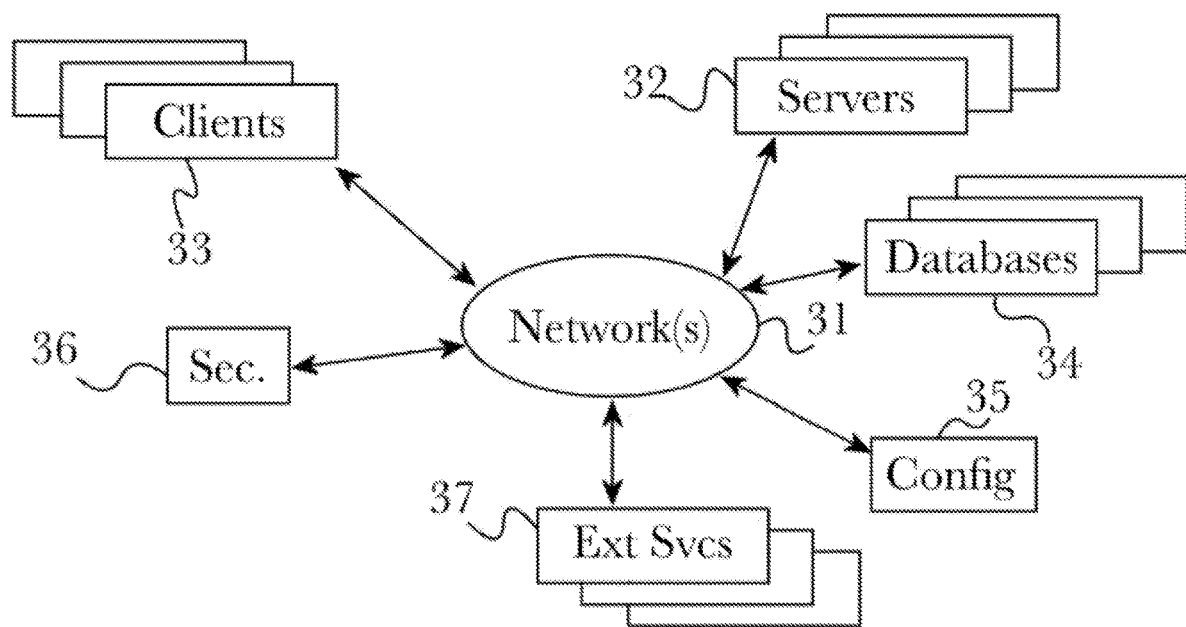
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
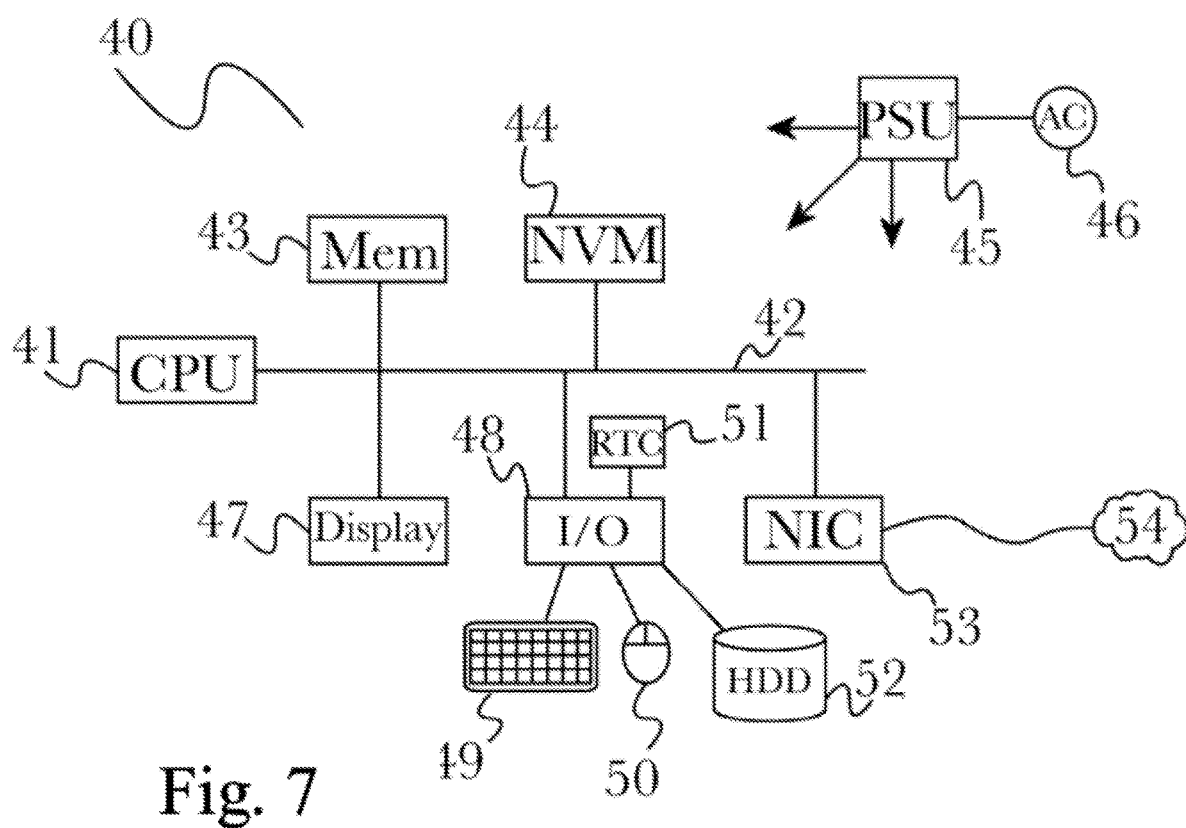
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer-implemented method for enabling a robotic control system associated with a robot to switch from a default configuration to an override configuration in order to process objects which cannot be processed in the default configuration, the method comprising:
   obtaining, by a processor, an override request identifying an object that cannot be processed by a robot based on a default configuration available to a robotic control system associated with the robot, the override request obtained from at least one of a vision system and an intervention system;

switching, by the processor, the default configuration to an override configuration upon receiving the override request, the switching enabling identification of additional instructions for use in control of the robot;

obtaining, by the processor, override control instructions comprising instructions that cannot be processed in the default configuration;

assigning, by the processor, pick tag data to each obtained override control instruction, the pick tag data indicating a source of the obtained override control instruction;

obtaining, by the processor, a validation for each obtained override control instruction indicating that the override control instruction is appropriate, the validation including a validation source identifier;

generating, by the processor, override switching instructions; and providing, by the processor, to the robotic control system at least one of the override control instructions and the generated override switching instructions, wherein the obtained override control instructions and the generated override switching instruction enable the robot associated with the robotic control system to process the object that cannot be processed based on the default configuration.

2. The computer-implemented method of claim 1, wherein the switching is executed automatically or via human input.

3. The computer-implemented method of claim 1, wherein the switching enables at least one of the vision system and the intervention system to provide additional instructions that cannot be processed in the default configuration.

4. The computer-implemented method of claim 1, wherein the validation is obtained automatically or via human input.

5. The computer-implemented method of claim 1, wherein a first override configuration requires a first validation and wherein a second override configuration requires a second validation different than the first validation.

6. The computer-implemented method of claim 1, further comprising storing, by the processor, the validation source identifier.

7. The computer-implemented method of claim 1, the pick tag data comprising a first tag providing that the override control instruction is obtained from the vision system, a second tag providing that the override control instruction is obtained from a combination of the vision system and the intervention system, and a third tag providing that the override control instruction is obtained from the intervention system.

8. The computer-implemented method of claim 7, wherein at least one of the second tag and the third tag is associated with an identifier indicative of a user associated with the intervention system.

9. The computer-implemented method of claim 1, further comprising obtaining pick space data, the pick space data comprising data associated with at least a first pick area and a second pick area, wherein the first pick area and second pick area have at least one different boundary.

10. The computer-implemented method of claim 9, wherein the first pick area defines an area within which a robot is constrained to performing operations under the default configuration and the second pick area defines an area extending beyond the first pick area along at least one dimension.

11. The computer-implemented method of claim 9, wherein the pick space data comprises at least one of two dimensional image data and three dimensional depth data.

12. The computer-implemented method of claim 9, wherein the override control instructions are determined based on the obtained pick space data.

13. The computer-implemented method of claim 9, wherein override control instructions from the vision system comprises override control instructions automatically determined from the pick space data.

14. The computer-implemented method of claim 9, wherein the override control instructions from the intervention system comprises override control instructions provided via human interaction with the intervention system in association with the obtained pick space data provided to the intervention system.

15. The computer-implemented method of claim 1, wherein providing the at least one of the override control instructions and the generated override switching instructions comprises providing the at least one of the override control instructions and the generated override switching instructions such that the robot is enabled to interleave the provided at least one of the override control instructions and the generated override switching instructions with control instructions from other sources or with control instructions associated with an existing object processing plan.

16. The computer-implemented method of claim 1, wherein the override control instructions enable the robot to exceed at least one limitation of the default configuration, the at least one limitation comprising at least one of an operational boundary, an operational force, an operational torque, an operational acceleration, an operational speed, an operational range of motion of the robot, an operational positioning of the robot, and an operational orientation of the robot.

17. The computer-implemented method of claim 1, wherein the override switching instructions comprise identification of an override configuration for the robotic control system to apply to controlling the robot.

18. The computer-implemented method of claim 1, wherein obtaining an override request comprises obtaining the override request via a selection an override option via a graphical user interface (GUI).

19. A computing system for for enabling a robotic control system associated with a robot to switch from a default configuration to an override configuration in order to process objects which cannot be processed in the default configuration, the computing system comprising:

at least one computing processor; and memory comprising instructions that, when executed by the at least one computing processor, enable the computing system to:

obtain, by a processor, an override request identifying an object that cannot be processed by a robot based on a default configuration available to a robotic control system associated with the robot, the override request obtained from at least one of a vision system and an intervention system;

switch, by the processor, the default configuration to an override configuration upon receiving the override request, the switching enabling identification of additional instructions for use in control of the robot;

obtain, by the processor, override control instructions comprising instructions that cannot be processed in the default configuration;

assign, by the processor, pick tag data to each obtained override control instruction, the pick tag data indicating a source of the obtained override control instruction;

obtain, by the processor, a validation for each obtained override control instruction indicating that the override control instruction is appropriate, the validation including a validation source identifier;

generate, by the processor, override switching instructions; and provide, by the processor, to the robotic control system at least one of the override control instructions and the generated override switching instructions, wherein the obtained override control instructions and the generated override switching instruction enable the robot associated with the robotic control system to process the object that cannot be processed based on the default configuration.

20. A non-transitory computer readable medium comprising instructions for enabling a robotic control system associated with a robot to switch from a default configuration to an override configuration in order to process objects which cannot be processed in the default configuration, the instructions, when executed by a processor, enable the processor to:

obtain, by a processor, an override request identifying an object that cannot be processed by a robot based on a default configuration available to a robotic control system associated with the robot, the override request obtained from at least one of a vision system and an intervention system;

switch, by the processor, the default configuration to an override configuration upon receiving the override request, the switching enabling identification of additional instructions for use in control of the robot;

obtain, by the processor, override control instructions comprising instructions that cannot be processed in the default configuration;

assign, by the processor, pick tag data to each obtained override control instruction, the pick tag data indicating a source of the obtained override control instruction;

obtain, by the processor, a validation for each obtained override control instruction indicating that the override control instruction is appropriate, the validation including a validation source identifier;

generate, by the processor, override switching instructions; and provide, by the processor, to the robotic control system at least one of the override control instructions and the generated override switching instructions, wherein the obtained override control instructions and the generated override switching instruction enable the robot associated with the robotic control system to process the object that cannot be processed based on the default configuration.

* * * * *